United States Patent [19]

Kawagishi

[11] Patent Number: 5,005,953

[45] Date of Patent: Apr. 9, 1991

[54] HIGH CONTRAST LIQUID CRYSTAL ELEMENT

[75] Inventor: Hideyuki Kawagishi, Fujisawa, Japan

[73] Assignee: Canon Kabushiki Kaisha, Tokyo, Japan

[21] Appl. No.: 438,046

[22] Filed: Nov. 20, 1989

Related U.S. Application Data

[63] Continuation-in-part of Ser. No. 253,077, Oct. 4, 1988, abandoned.

[30] Foreign Application Priority Data

Oct. 6, 1987 [JP] Japan ................. 62-250676
Mar. 2, 1989 [JP] Japan ................. 1-48556

[51] Int. Cl.$^5$ ............................. G02F 1/133
[52] U.S. Cl. .................. 350/341; 350/350 S
[58] Field of Search ............... 350/350 S, 341

[56] References Cited

U.S. PATENT DOCUMENTS

| | | | |
|---|---|---|---|
| 4,709,994 | 12/1987 | Kanbe et al. | 350/350 S |
| 4,712,873 | 12/1987 | Kanbe et al. | 350/350 S |
| 4,820,026 | 4/1989 | Okada et al. | 350/350 S |
| 4,878,740 | 11/1989 | Inada et al. | 350/350 S |
| 4,883,344 | 11/1989 | Okada et al. | 350/350 S |
| 4,898,456 | 2/1990 | Okada et al. | 350/350 S |
| 4,941,736 | 7/1990 | Taniguchi et aql. | 350/350 S |

FOREIGN PATENT DOCUMENTS

2183054 5/1987 United Kingdom ............ 350/350 S

*Primary Examiner*—Stanley D. Miller
*Assistant Examiner*—Anita Pellman Gross
*Attorney, Agent, or Firm*—Fitzpatrick, Cella, Harper & Scinto

[57] ABSTRACT

A liquid crystal element has a pair of substrates including electrodes and uniaxial orientation-processing axes, a ferroelectric smectic liquid crystal having a temperature range for producing a smectic A phase, under an orientation state having at least two different average molecular axes disposed between the pair of substrates which are set at a distance sufficiently small for suppressing a spiral alignment structure of the ferroelectric smectic liquid crystal on the occasion of no field application, and a polarizer and an analyzer. The ferroelectric smectic liquid crystal, on the occasion of being set within a temperature range for a smectic A phase, produce a $|T_A - T_B|$ value no larger than 4% the maximum value thereof within a wavelength range of 440-600 nm, and at the same time being under an orientation state for producing an angle between two different average molecular axes on the occasion of no voltage application smaller than an angle between two different average molecular axes on the occasion of voltage application, where TA(%) is transmittance produced under an orientation state having one average molecular axis under a disposition of the polarizer and the analyzer on the occasion of setting 90° cross nicols in the darkest state, and subsequently rotating only the analyzer clockwise by 15° with regard to the processing direction of an incident light from the darkest state at the temperature range of smectic A phase, $T_B$ being transmittance under an orientation state having another average molecular axis under a disposition of the polarizer and the analyzer on the occasion of rotating only the analyzer counterclockwise by 15° with regard to the proceeding direction of the incident light from said darkest state at the temperature range of smectic A phase.

16 Claims, 10 Drawing Sheets

ELLIPTIC COLOR IN FAN-TYPE ORIENTATION ( EXAMPLE d = 1.28 μm )

FIG. 7 (b)

ELLIPTIC COLOR IN SPLAY-TYPE ORIENTATION ( COMPARATVE EXAMPLE d = 1.30 μm )

HIGH CONTRAST LIQUID CRYSTAL ELEMENT

This application is a CIP of Ser. No. 07/253,077, filed Oct. 4, 1988, now abandoned.

BACKGROUND OF THE INVENTION

1. Field of the Invention

This invention relates to a surface-stabilized ferroelectric liquid crystal (SSFLC) element in a bistable orientation state. The SSFLC has applications as for a display, a printer head and the like.

2. Description of the Prior Art

N. A. Clark et al. have disclosed (for example, in U.S. Pat. No. 4,367,924 and U.S. Pat. No. 4,563,059) that a liquid crystal element is bistable, i.e., which produces two different stable orientation states in the absence of an electric field, and so, has a memory capability as a result, can be obtained by disposing a ferroelectric smectic (chiral smectic C or H) liquid crystal (which produces a sprial alignment structure in bulk) between a substrate spacing small enough for supporessing a spiral alignment structure thereof. N. A. Clark et al. use the application of magnetic field or shearing to obtain the bistable orientation state, but practically speaking, it is preferable to use rubbing processing or oblique evaporation processing for orientation processing. A liquid crystal element in which rubbing processing or oblique evaporation processing has been utilized in order to obtain a bistable orientation state having a monodomain has been disclosed, for example, by S. Okada et al. in U.S. Pat. No. 4,639,089. However, a ferroelectric smectic liquid crystal having a bistable orientation state with a monodomain obtained by rubbing processing or oblique evaporation processing has a disadvantage in that the amount of transmission light under the memory state is smaller compared with the bistable crystal of N. A. Clark et al.

Accordingly, the present inventor has investigated the possibility of producing a novel bistable orientation state which attains the same degree of optical modulation effect product from a bistable orientation state as that disclosed by N. A. Clark et al., even while utilizing the more practical rubbing processing or oblique evaporation processing as the orientation processing means.

SUMMARY OF THE INVENTION

It is an object of the present invention to provide a ferroelectric liquid crystal element having a bistable orientation state which performs a display with improved contrast.

The feature, and others, are provided by the novel liquid crystal element of the present invention which comprises a pair of substrates including electrodes and uniaxial orientation-processing axes, a ferroelectric smectic liquid crystal having a temperature range for producing a smectic A phase under an orientation state having at least two different average molecular axes by being disposed between said pair of substrates set at a distance sufficiently small for suppressing a spiral alignment structure of the ferroelectric smectic liquid crystal on the occasion of no field application, and a polarizer and a analyzer, wherein the ferroelectric smectic liquid crystal produces a $|T_A-T_B|$ value no larger than 4% the maximum value thereof within a wavelength of 440–600 nm, while being under an orientation state for producing an angle between two different average molecular axes without voltage application which is less than an angle between two different average molecular axes during voltage application, where $T_A$ (%) is a transmittance produced under an orientation state having one average molecular axis under a disposition of the polarizer and the analyzer when the polarizer and the analyzer (consisting of 90° crossed nicols) is set in the darkest state at the temperature range of the smectic A phase, and subsequently rotating only the analyzer clockwise by 15° from said darkest state with regard to the proceeding direction of an incident light from said darkest state, and $T_B$ is a transmittance produced under an orientation state having another average molecular axis under a disposition of the polarizer and the analyzer when only the analyzer is rotated counterclockwise by 15° with regard to the proceeding direction of the incident light from said darkest state.

DETAILED DESCRIPTION OF THE INVENTION

Figure 1:
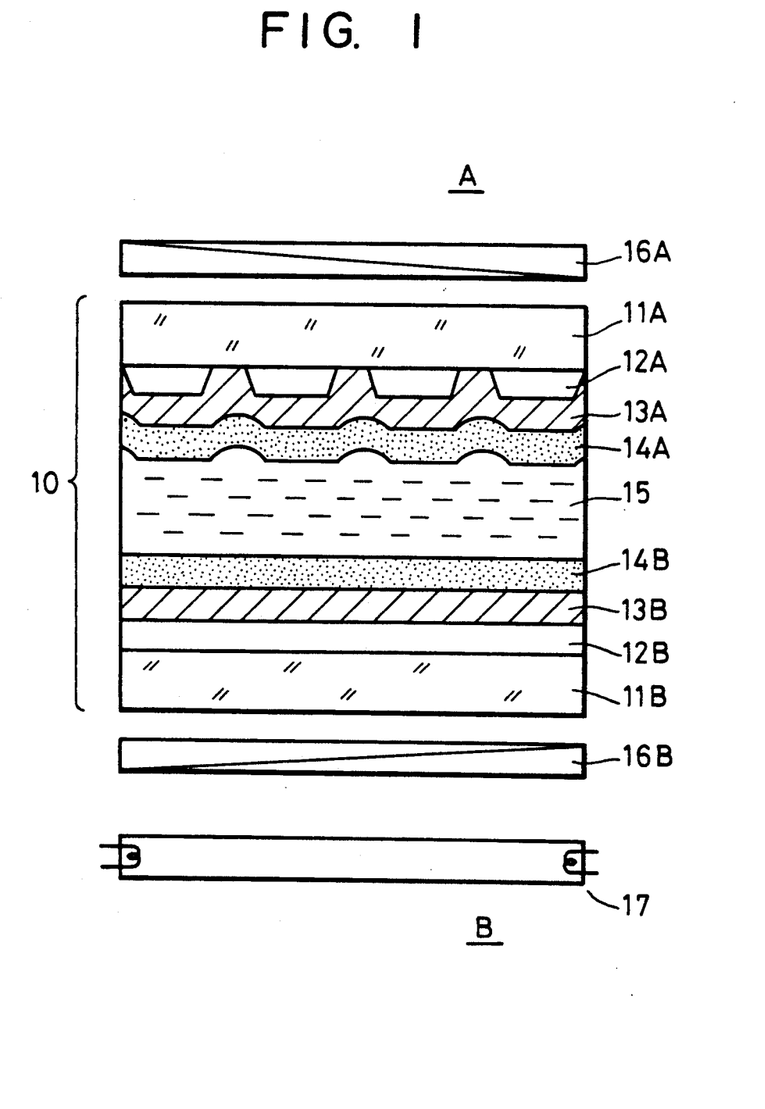
FIG. 1 is a cross-sectional view of a ferroelectric liquid crystal element of the present invention.

FIG. 1 is a cross-sectional view of a ferroelectric liquid crystal (FLC) element of the present invention. In order that a ferroelectric smectic liquid crystal 15 within the liquid crystal element produces a $|T_A-T_b|$ value no larger than 4% the maximum value thereof within a wavelength of 440–600 nm, while being under an orientation state for producing an angle between two different average molecular axes without voltage application which is less than an angle between two different average molecular axes during voltage application, it is preferably to use a ferroelectric smectic liquid crystal having a spiral pitch having not less than 2 μm and preferably not less than 5 μm (measured at the temperature of the smectic A–C phase transition point minus 5° C.)

It will be noted that the present invention is effective for a ferroelectric smectic liquid crystal element under an orientation state wherein an angle between two different average molecular axes (twice the apparent tilt angle) under no voltage-application is no larger than 75% preferably no larger than 50% and more preferably, no larger than 30%, of an angle between two different average molecular axes during voltage application (twice the maximum tilt angle).

EXAMPLE 1

In FIG. 1, transparent electrodes 12A and 12B made of ITO (Indium-Tin-Oxide) films and 1000 Å thick $SiO_2$ insulating films 13A and 13B were formed by sputtering on glass substrates 11A and 11B. Next, an aqueous polyvinyl alcohol solution ("PVA 117", a product of Kraray Co., Ltd.) was coated as orientation-control films 14A and 14B, and was baked at 180° C. for 1 hour. Then, a parallel rubbing processing was performed as a uniaxial orientation-processing on the upper and lower substrates in directions opposite to one another. Subsequently, the two substrates 11A and 11B were affixed using interposing bead spacers (not illustrated) having 1.5 μm diameter. The substrates 11A and 11B were orientated such that electrodes 12A and 12B face one another and the circumference was sealed by a sealing material (not illustrated), and at the same time FLC 15 ("CS1014", a product of Chisso Corp.) was injected therein to obtain FLC cell 10. An analyzer 16A was disposed at the viewing side A and a polarizer 16B was disposed at the side B of a back light 17 of the FLC cell 10, and at the same time, the cell 10 was disposed in a position where the smectic A (SmA) phase becomes darkest under the state of crossed nicols of the analyzer 16A and polarizer 16B. Then, the absolute value $|T_A - T_B|$ of the difference between the transmittance $T_A$ under a first orientation state (having one average molecular axis) of the FLC 15 in a chiral smectic C (SmC*) phase when only the analyzer 16A is rotated clockwise 15° with regard to the direction of incident light, and the transmittance $T_a$ under a second orientation state (having another average molecular axis) when only the analyzer 16A is rotated counterclockwise 15° with regard to the direction of incident light, was measured at 1.1% using incident light having a wavelength of 440 nm and was measured at 0.5 % using incident light having a wavelength of 600 nm. That is, it was confirmed that within a wavelength range of 440–600 nm, the orientation state of the FLC 15 is such that the maximum value of $|T_A - T_B|$ becomes not larger than 4%. Such an orientation state of the FLC 15 is determined by an interaction between the orientation-control films 14A and 14B of the cell 10 and the liquid crystal material, especially by the pitch of spiral of the FLC 15.

Next, the above-described cell 10 was visually adjusted in the darkest position under the state of crossed nicols of the analyzer 16A and the polarizer 16B, and then transmittance $T_L$ under the first (light) orientation state and transmittance $T_D$ under the second (dark) orientation state were measured. It has become evident that the contrast ($T_L/T_D$) has been largely improved compared with the conventional data. More concretely, a high contrast was obtained, shown as  in FIG. 2. For examples, within an incident light wavelength range of 500–650 nm, a high contrast of not less than 100 was obtained.

It was also measured that the transmittance of the cell 10 under the dark state is not larger than 2% within visible range, and it was confirmed that the color of the dark state is black even under visual observations. That is, when the present invention is applied to, for example, a display, a black and white display with an excellent quality which is regarded easy to visually observe becomes possible.

EXAMPLE 2

The cell 10 was constructed in the same way as in Example 1, except that the parallel rubbing processing was performed such that the rubbing directions were in the same direction for the both substrates. The $|T_A - T_B|$ value of the cell 10 at a wavelength of 440 nm was 1.5%, and the $|T_A - T_B|$ value at a wavelength of 600 nm was 0.3%. That is, it was confirmed that the orientation state of the FLC 15 is such that the maximum value of $|T_A - T_B|$ becomes no larger than 4% within a wavelength range of 440–600 nm.

Figure 2:
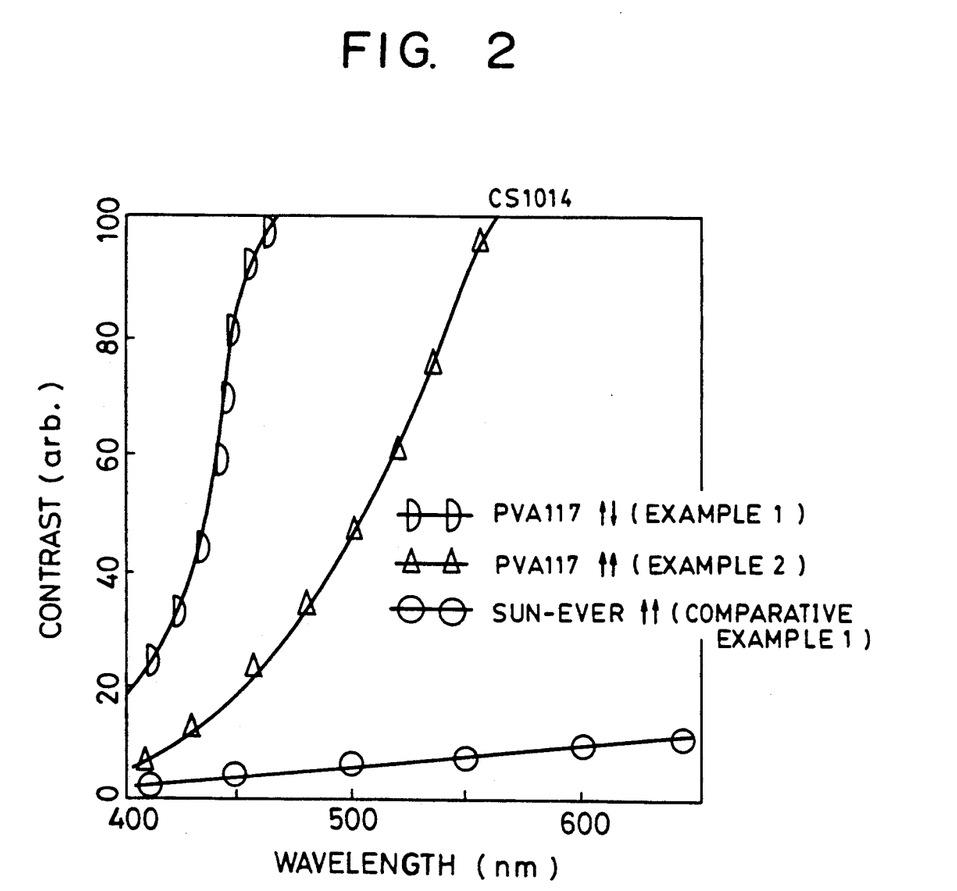
FIG. 2 illustrates a relationship between wavelength and contrast.

Next, the contrast ($T_L/T_D$) of the cell 10 of the present Example 2 was measured in the same way as in the above-described Example 1 to obtain a result shown as  in FIG. 2. As is apparent from FIG. 2, although the contrast of the cell of Example 2 is inferior to that of Example 1 in shorter wavelengths, an excellent contrast characteristics no smaller than 100 was nonetheless realized in a wavelength range of at least 560 nm.

COMPARATIVE EXAMPLE 1

The cell 10 was constituted in the same way as in Example 1, except that a polyimide orientation-control film 14A and 14B ("Sun-ever 257", a product of Nissan Petrochemicals, Ltd.) fired at 250° C., for 1 hour was used. The $|T_A - T_B|$ value of the cell 10 at a wavelength of 440 nm was 7.9%, and the $|T_A - T_B|$ value at a wavelength of 600 nm was 2.0%. That is, it was confirmed that the orientation state of the FLC 15 is such that the maximum value of $|T_A - T_B|$ becomes no smaller than 4% within a wavelength range of 440–600 nm.

Next, the contrast ($T_L/T_D$) of the cell of Comparative Example 1 was measured in the same way as in Example 1 to obtain a result shown as (  ) in FIG. 2. In the cell of Comparative Example 1, the contrast within a wavelength range of 400–650 nm is not longer than 10, and so is lower than those of the cells of Examples 1 and 2.

COMPARATIVE EXAMPLE 2

The cell 10 was constructed in the same way as in Example 1, except that polyethylene was used as the orientation-control film. The $|T_A - T_B|$ value of the cell at a wavelength of 440 nm was 2.4%, and the $|T_A - T_B|$ value at a wavelength of 600 nm was 4.4%. That is, it was confirmed that the orientation state of the FLC 15 is such that the maximum value of $|T_A - T_B|$ becomes no smaller than 4% within a wavelength range of 440–600 nm.

The contrast ($T_L/T_D$) of the cell of Comparative Example 2 was measured in the same way as in Example 1 to obtain the contrast not larger than 10 within a wavelength range of 400–650 nm as in Comparative Example 1, resulting in a cell having a low contrast.

COMPARATIVE EXAMPLE 3

The cell 10 was constituted in the same way as in Example 1, except that a polyimide orientation-control film ("SP 710", a product of Toray Industries, Inc.) was used, and as the FLC 15, "CS1017" (a product of Chisso Corp.) was used. The $|T_A - T_B|$ value of the cell 10 at a wavelength of 440 nm was 12.2%, and the $|T_A - T_B|$ value at a wavelength of 600 nm was 3.7%. That is, it was confirmed that the orientation state of the FLC 15 is such that the maximum value of $|T_A - T_B|$ becomes no smaller than 4% within a wavelength range of 440–600 nm.

The contrast $(T_L/T_D)$ of the cell of Comparative Example 3 was measured in the same way as in Example 1 to obtain a cell having a low contrast like in the above-described Comparative Examples 1 and 2.

Figure 3:
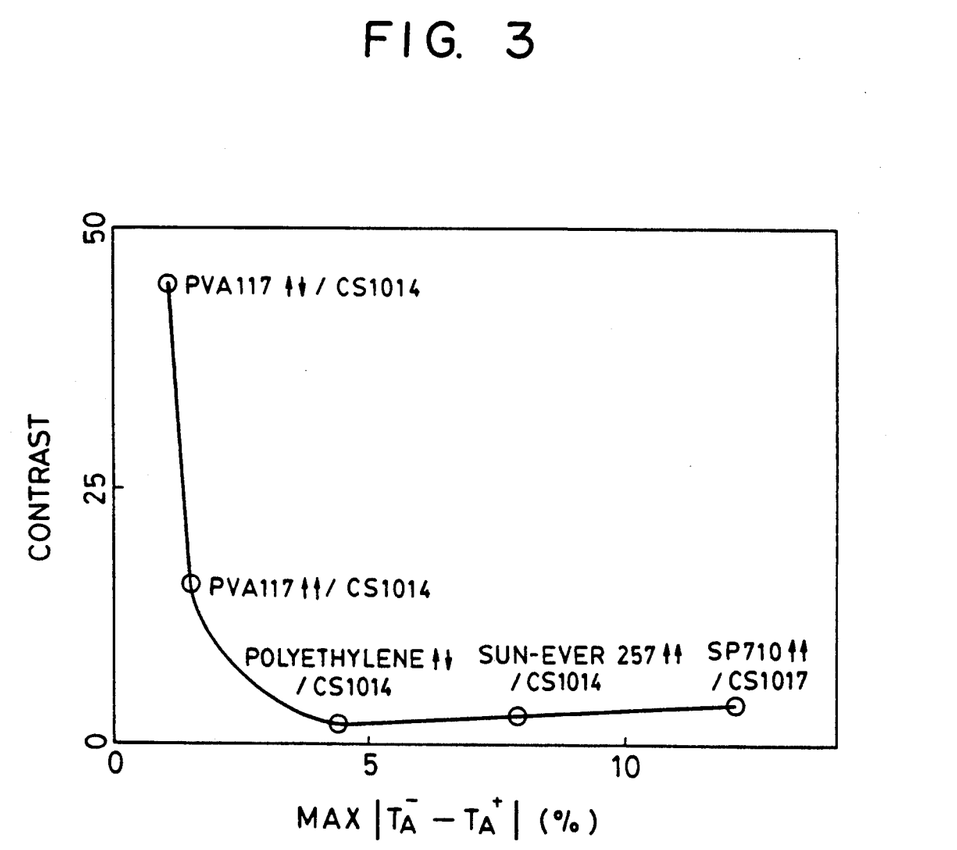
FIG. 3 illustrates a relationship between MAX $|T_A-T_B|$ and contrast.

The results of the measurements with regard to the cells in the above-described Examples 1 and 2, and Comparative Examples 1–3 are shown in the following TABLE 1, and a relationship between the maximum value (MAX) of $|T_A-T_B|$ within a wavelength range of 440–600 nm and the contrast at a wavelength of 440 nm is shown in FIG. 3.

TABLE 1

| Example | Orientation-control film | Rubbing | FLC | Pitch of spiral |
|---|---|---|---|---|
| Example 1 | PVA117 | ↑ ↓ | CS1014 | 8.6 μm |
| Example 2 | PVA117 | ↑ ↓ | CS1014 | 8.6 μm |
| Comparative Example 1 | Sun-ever257 | ↑ ↑ | CS1014 | 8.6 μm |
| Comparative Example 2 | Polyethylene | ↑ ↓ | CS1014 | 8.6 μm |
| Comparative Example 3 | SP710 | ↑ ↑ | CS1017 | 2.0 μm |

| Example | $|T_A - T_B|$ Max | Contrast | Maximum tilt angle | Apparent tilt angle |
|---|---|---|---|---|
| Example 1 | 1.1% | 44.8 | 21° | 5.8° |
| Example 2 | 1.5% | 15.9 | 21° | 5.9° |
| Comparative Example 1 | 7.9% | 3.1 | 21° | 6.2° |
| Comparative Example 2 | 4.4% | 2.0 | 21° | 5.7° |
| Comparative Example 3 | 12.2% | 4.1 | 26° | 6.1° |

In TABLE 1, ↑ ↓ denotes a parallel rubbing processing in directions opposite to one another for the upper substrate 11A and the lower substrate 11B, and ↑ ↑ denotes a parallel rubbing processing having the same direction for both the upper substrate 11A and the lower substrate 11B. The values of the maximum tilt angles and apparent tilt angles were obtained by the measurement at room temperature.

Next, the difference in the orientation states characterized by $|T_A-T_B|$ will be explained from the standpoint of orientation color.

Figure 4:
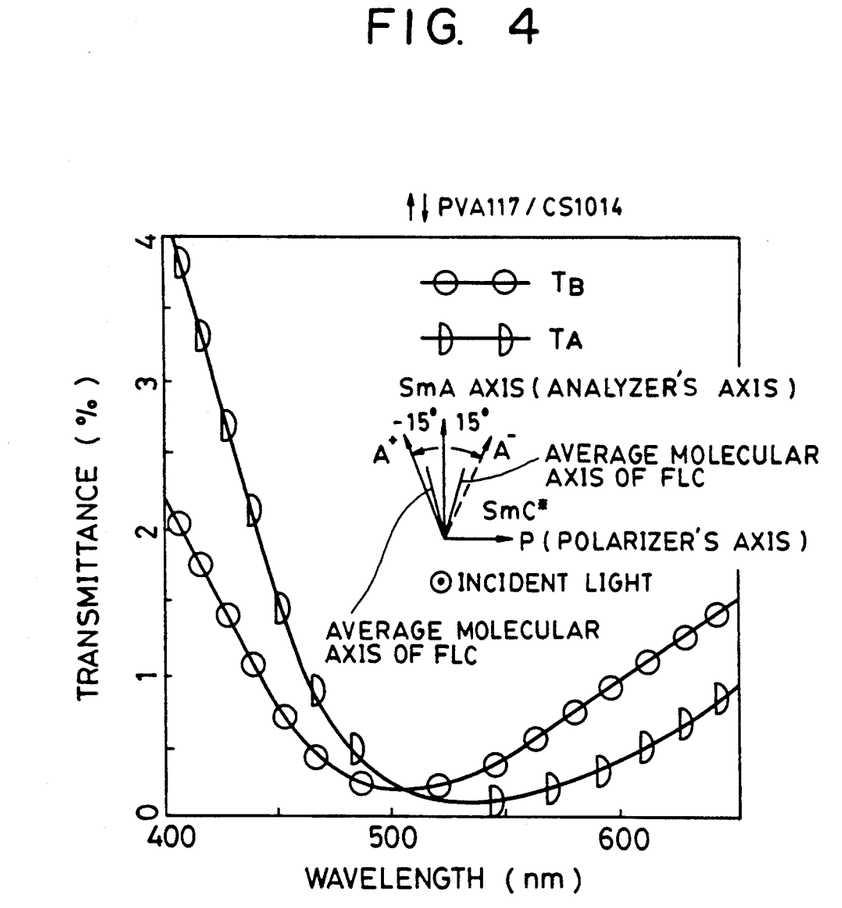
FIGS. 4 and 5 illustrate a relationship between wavelength and transmittance in Example 1.

FIG. 4 shows the results of the measurement of the wavelength dependency of $T_A$ and $T_B$ in Example 1. From FIG. 4, it can be concluded that the value of $|T_A-T_B|$ is small and the wavelength characteristic is nearly equal for $T_A$ and $T_B$. It will be also noted that the orientation color of the FLC on the occasion of the measurement of $T_A$ and $T_B$ was pale purple by visual observation for both cases.

Figure 5:
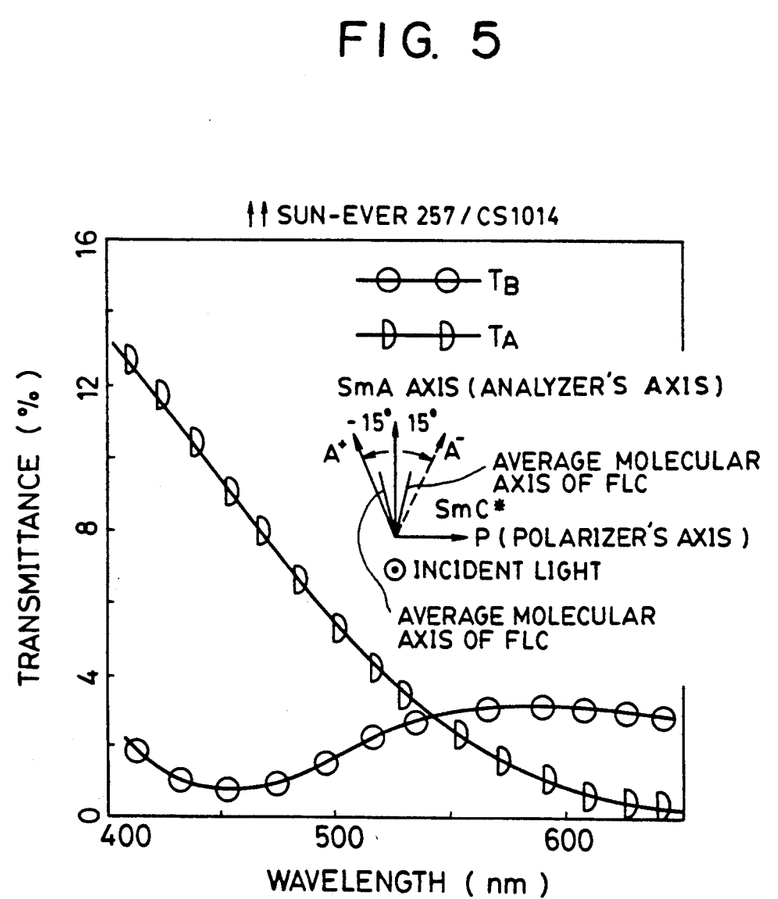

In FIGS. 4 and 5, A− denotes the analyzer's axis rotated clockwise 15°, and A+ denotes the analyzer's axis rotated counterclockwise 15°.

On the other hand, FIG. 5 shows the dependence of wavelength of $T_A$ and $T_B$ in comparative Example 1. From FIG. 5, it can be concluded that the value of $|T_A-T_B|$ is large in general, and $T_A$ and $T_B$ have different wavelength characteristics. The orientation color of the FLC when $T_A$ and $T_B$ were measured by visual observation was brown for $T_B$, and blue for $T_A$.

That is, the difference in the orientation states is apparent between the Examples and the Comparative Examples from the difference in the orientation colors, and at the same time a qualitative difference in the transmittance characteristics such that $T_A$ and $T_B$ are in coincidence or out of coincidence was observed.

EXAMPLE 4

Figure 6:
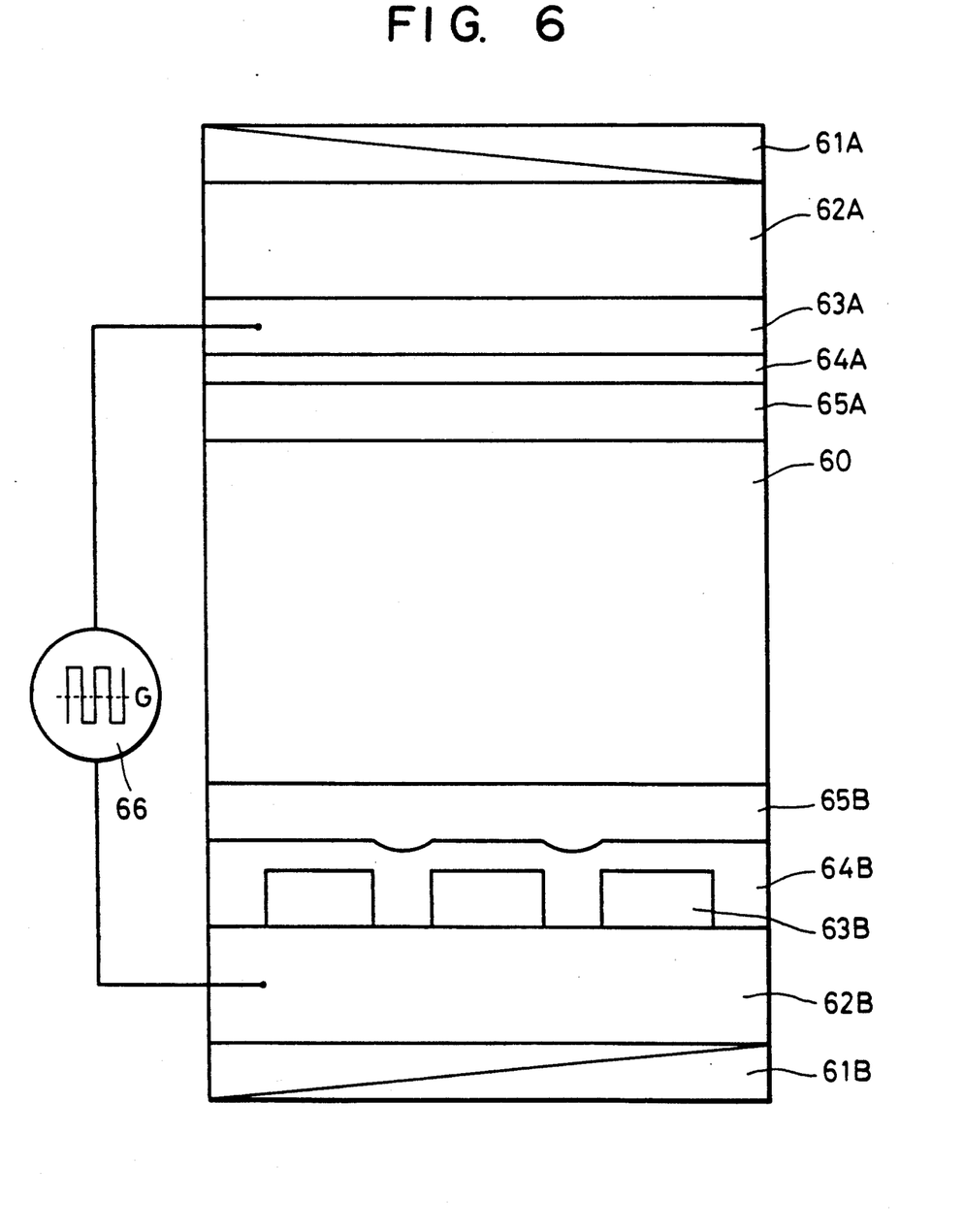
FIG. 6 is a cross-sectional view of a ferroelectric liquid crystal element according to an embodiment of the present invention.

FIG. 6 shows a cross section of a ferroelectric liquid crystal element according to an embodiment of the present invention. In FIG. 6, a ferroelectric liquid crystal 60 has a negative dielectric anisotropy Δε and is in a FAN-type orientation state. A power supply 66 generates an AC voltage (an AC voltage insufficient to switch the FLC from an orientation state having one (or another) average molecular axis to an orientation state having another (or one) average molecular axis). Particularly in this case, a liquid crystal (a ferroelectric liquid crystal CS1011 (trademark) made by Chisso Corp.) having a Δε of −3.9 (at 100 kHz) was used as the ferroelectric liquid crystal 60. There are also provided an analyzer 61A, a polarizer 61B, substrate glasses 62A and 62B, transparent electrodes (ITO) 63A and 63B, insulating layers (SiO₂) 64A and 64B, and organic orientation films 15A and 15B. Particularly in this case, PVA117 (product name), which is polyvinyl alcohol made by Kraray Co., Ltd., was used as the organic orientation films 15A and 15B.

The ferroelectric liquid crystal 60 is sandwiched between the organic orientation films 15A and 15B, and is in the FAN-type orientation state within a surface-stabilized ferroelectric liquid crystal cell 1.28 μm thick.

Figure 7A:
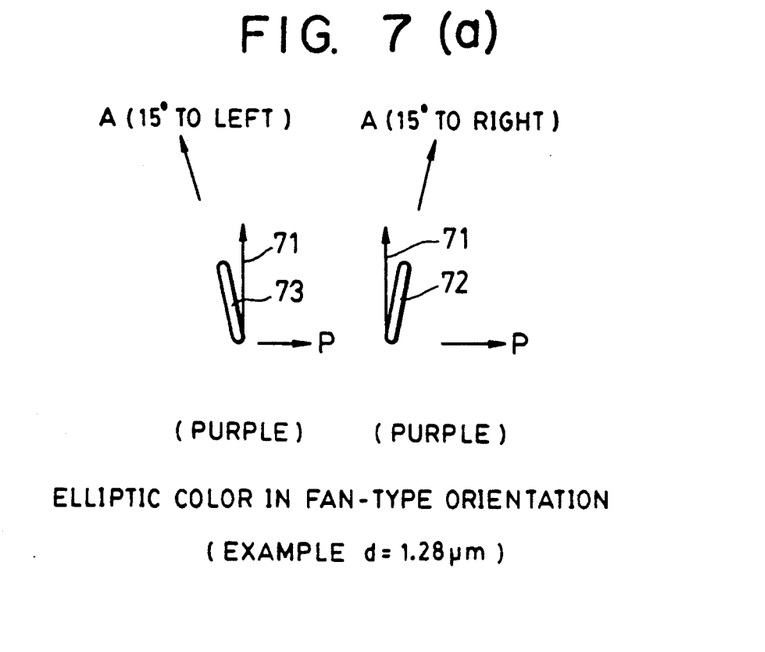
FIG. 7 is a conceptional diagram indicating colors when an analyzer is rotated.

This can be understood from the fact that, as shown in FIG. 7(a), the color of a first orientation state having an average molecular axis to the right when the analyzer 61A as the polarizer closer to the observer is rotated about 15° to the right (clockwise) and the color of a second orientation state having an average molecular axis to the left when the analyzer 61A is rotated about 15° to the left (counterclockwise) are both purple and nearly equal to each other.

In this case, the right or left for the direction of rotation of the analyzer 61A and the average molecular axis are defined whether they are to the right or left relative to the rubbing direction 71, as shown in FIG. 7. In FIG. 7, the analyzer 61A rotated 15° to the right is indicated by A−(15° to the right), and the analyzer 61A rotated 15° to the left is indicated by A+(15° to the left). There are also shown a right average molecular axis 72, a left average molecular axis 73, and the axis P of the polarizer 61B which is the polarizer closer to the light source.

Elliptic colors, which are colors when the analyzer 61A is rotated to the right and to the left were both purple in the present Example since the cell was 1.28 μm thick. The FAN-type orientation state has the feature, however, that the color changes as the thickness of the cell changes. The color became from purple to blue purple at the thickness of the cell of about 1.0–1.4 μm, and form blue to light blue at the thickness of about 1.4–2.5 μm. The color was observed using a halogen lamp for microscope as a light source.

Figure 8:
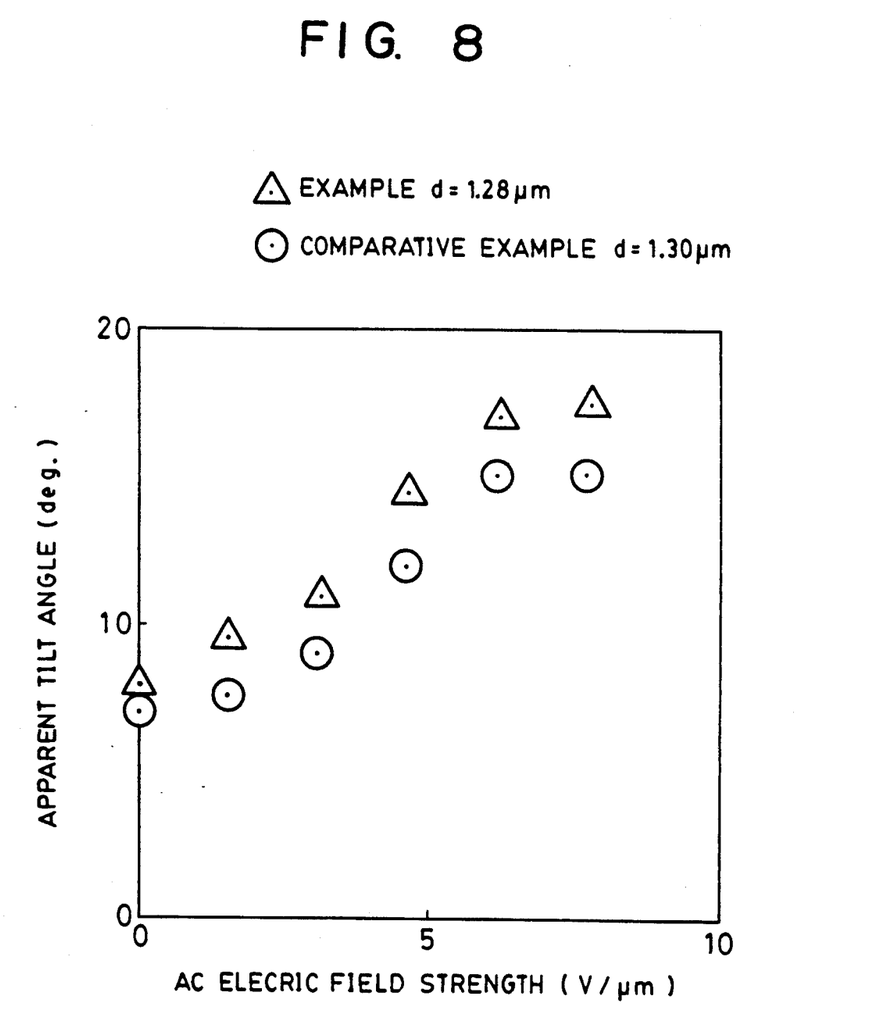
FIG. 8 is a graph showing a spread characteristic of apparent tilt angle relative to the strength of applied AC electric field.

Data indicated by ▲ in FIG. 8 are the results of an experiment in which how the apparent tilt angle $\theta_a$ spreads relative to the strength of the applied AC electric field when 60-kHz AC driving voltages are applied to the above-described ferroelectric liquid crystal element of the present Example was investigated. It can be understood that the apparent tilt angle $\theta_a$ easily spreads compared with data indicated by ⊙ which will be described later.

Figure 9:
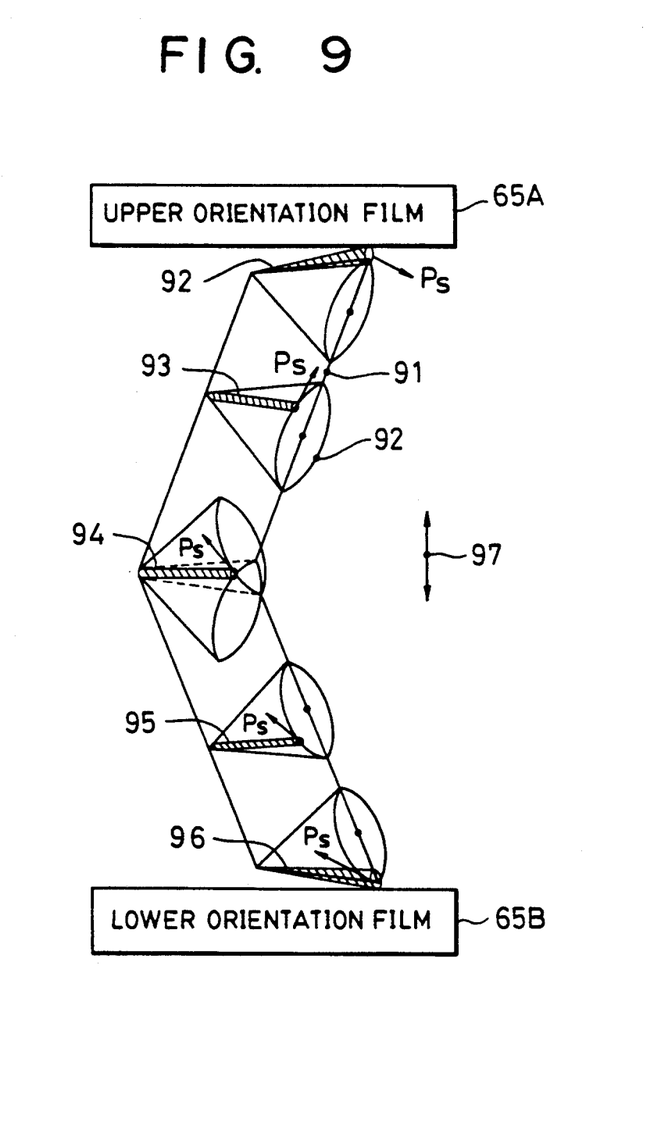
FIG. 9 is a model drawing indicating an alignment of liquid crystal molecules in a FAN-type orientation state; an FIGS. 10 and 11 represent ferroelectric liquid crystals.

FIG. 9 is a model drawing indicating an alignment of liquid crystal molecules in the FAN-type orientation state. In FIG. 9, there are shown a chevron-type layered structure 91 of the SmC* phase, a cone 92 of the SmC* phase, and FLC molecules 92-96. There are also shown an example of the direction $P_s$ of spontaneous polarization, and an applied AC electric field 97.

From FIG. 9, it can be understood that the apparent tilt angle $\theta_a$ easily spreads relative to the AC electric field in the FAN-type orientation state since molecules are less twisted, and it is suitable to use such an orientation state in an AC-stabilized FLC display.

COMPARATIVE EXAMPLE

Next, as a comparative example, an explanation will be provided of a case in which the color of a stable state at the side of the right average molecular axis when the analyzer 61 A is rotated to the right differs from the color of a stable state at the side of the left average molecular axis when the analyzer 61A is rotated to the left.

Figure 7B:
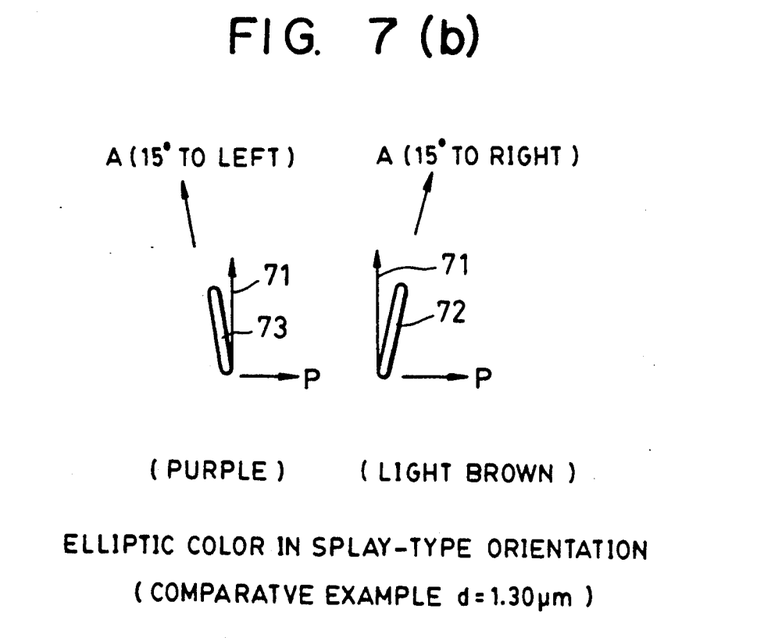

FIG. 7(b) is a conceptional diagram indicating colors (elliptic colors) when the analyzer 61A is rotated to the right and left. In the present Comparative Example, a stable state at the side of the right average molecular axis 72 when the analyzer 61A was rotated 15° to the right had a light brown color. On the other hand, a stable state at the side of the left average molecular axis 73 when the analyzer 61A was rotated 15° to the left had a purple color. The two states had obviously different colors from each other. Such an orientation state in which elliptic colors are different from each other is termed here a splay-type orientation.

In the present Comparative Example, the cell was prepared in the same way as in the above-described Example 4 except that polyimide was used as the organic orientation film, and the thickness of the cell was 1.30 μm which is nearly equal to that of Example 4.

The elliptic color in the splay-type orientation also changes as the thickness of the cell changes. The color of a stable state at the side of the left average axis 73 when the analyzer 61A was rotated 15° to the left usually became from purple to blue purple at the thickness of the cell of about 1.0-1.4 μm, and from blue to light blue at the thickness of 1.4-2.5 μm. On the other hand, the color of a stable state at the side of the right average molecular axis 72 when the analyzer 61A was rotated 15° to the right became from brown to light brown at the thickness of the cell of about 1.0-1.4 μm, and from light brown to light yellow at the thickness of 1.4-2.5 μm.

The elliptic color more or less differs, however, according to differences in the orientation state of molecules at the interface in the SmC* even at the same thickness of the cell.

Data indicated by ⊙ in FIG. 8 are the results of an experiment in which how the apparent tilt angle $\theta_a$ spreads relative to the strength of the applied AC electric field when 60-kHz AC driving voltages are applied to the liquid crystal element of present Comparative Example was investigated. It can be understood that the apparent tilt angle $\theta_a$ of the splay-type orientation cell of the present Comparative Example spreads less than the FAN-type orientation cell of the Example 4.

Figure 10:
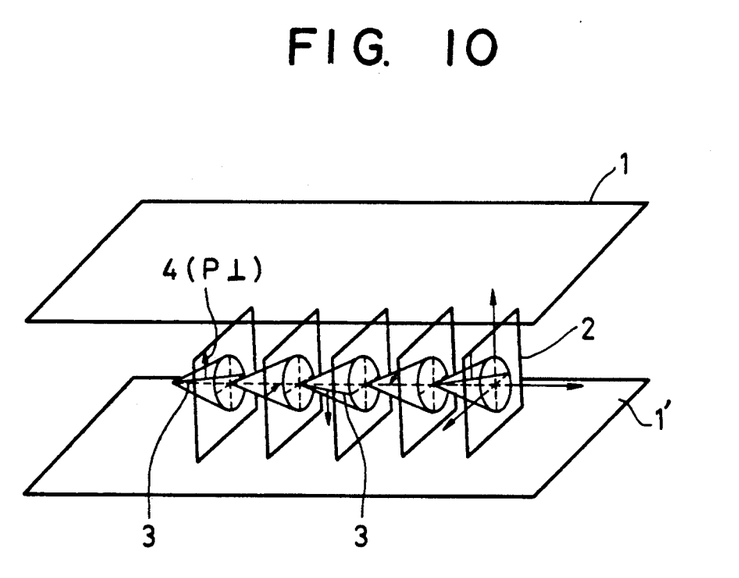
Figure 11:
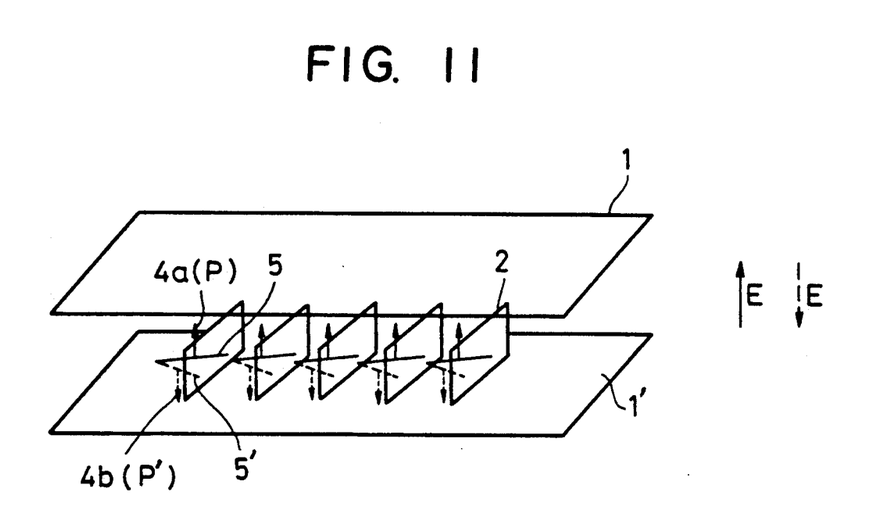

FIG. 10 graphically exemplifies a ferroelectric liquid crystal cell, wherein SmC*-phase liquid crystal molecular layers 2 oriented perpendicular to the glass surfaces are sealed between substrates (glass plates) 1 and 1' on which transparent electrodes such as $In_2O_3$, $SnO_2$ or ITO (Indium-Tin-Oxide) are coated. Lines 3 shown represent liquid crystal molecules, which have dipole moments (P⊥) 4 in the direction orthogonal to each molecule. When a predetermined voltage not smaller than the threshold value is applied between the electrodes on the substrates 1 and 1', the spiral structure of the liquid crystal molecules 3 becomes untangles, and the orientation direction of the liquid crystal molecules 3 can be changed so that all the dipole moments (P⊥) 4 are aligned to the direction of the electric field. The liquid crystal molecule 3 is long in shape, and shows an anisotropy in the refractive index between the direction of the long axis and the direction of the short axis, Consequently, it will be easily understood that when polarizers disposed in a position-relationship of crossed nicols one another are placed to the upper and lower sides of the glass surfaces, a liquid-crystal optical modulation element which changes optical characteristics by the polarity of the applied voltage can be obtained. Furthermore, in the case of a sufficiently thin liquid crystal cell (for example, 1 μm), the spiral structure of the liquid crystal molecules becomes untangled (non-spiral structure) even under a state of no voltage application, as shown in FIG. 11 and the dipole moment P or P' adopts either of the upward state (4a) or the downward state (4b). Such a liquid crystal cell which untangles the spiral structure of the liquid crystal molecules due to an interfacial effect is called a surface-stabilized-type cell. When an electric field E or E' having a predetermined value not smaller than the threshold value whose polarities differ from each other is applied to the SSFLC cell for a predetermined time as shown in FIG. 11, the dipole moment changes direction to the upward state (4a) or the downward state (4b) in accordance with the electric field vector E or E', and accordingly, the liquid crystal molecules assume either a first orientation state 5 or a second orientation state 5'.

The advantages of using such a ferroelectric liquid crystal as an optical modulation element is that the response speed is extremely high, and the orientation of the liquid crystal molecules has a bistable state. In FIG. 11, for example, when the electric field E is applied, the liquid crystal molecules are oriented to the first orientation state 5, which is stable even when the electric field is turned off. On the other hand, when the reverse electric field E' is applied, the liquid crystal molecules are oriented to the second orientation state 5' by changing the direction of the molecules, and remain so even while the electric field remains off. Furthermore, each orientation state is maintained as long as the applied electric field E does not exceed a predetermined threshold value. In order that such a high response speed and bistability can be realized effectively, the cell is preferably as thin as possible, should be in general 0.5-20 μm, more particularly 1-5 μM. A liquid-crystal electrooptical device having a matrix-electrode structure using this kind of ferroelectric liquid crystal has been proposed, for example, by Clark and Lagerwall in U.S. Pat. No. 4,367,924.

As explained above, according to the present invention, it is possible to provide a ferroelectric liquid crystal cell having a high contrast and an excellent quality of display by using an orientation state of FLC such that the value of $|T_A - T_B|$ within a wavelength of 440-600 nm is less than 4%.

Furthermore, according to the present invention, since a liquid crystal having a negative dielectric anisotropy is used and a FAN-type orientation state is also used in a ferroelectric liquid crystal element, the spread angle of the apparent tilt angle at a relatively low voltage becomes large, and so a bright display can be realized at a low voltage.

Moreover, the spread of the apparent tilt angle becomes further larger, if an AC electric field, which has a field strength and a frequency sufficient to increase the angle between the direction of the average molecular axis of a first stable state and the direction of the average molecule axis of a second stable state at a non-switching state of the orientation state compared with at the moment of no electric field application, is applied to the electrodes of the liquid crystal.

What is claimed is:

1. A liquid crystal element comprising:
  a pair of substrates, each of said substrates including electrodes and uniaxial orientation-processing axes;
  a ferroelectric smectic liquid crystal disposed between said substrates and having a temperature range for producing a smectic A phase, said liquid crystal being in an orientation state having at least two different average molecular axes by being disposed between said pair of substrates which are separated by a distance which is small enough to suppress a spiral alignment structure of the ferroelectric smectic liquid crystal in the absence of an electric field; and
  a polarizer and an analyzer at 90° crossed nicols, wherein said ferroelectric smectic liquid crystal has a $|T_A - T_B|$ value no larger than 4% in the maximum value thereof within a wavelength of 440–600 nm, when oriented to produce in the absence of voltage, an angle between two different average molecular axes less than an angle between two different average molecular axes when voltage is applied, where $T_A$ (%) is transmittance in an orientation state having one average molecular axis when the arrangement of the polarizer and the analyzer is in the darkest state of the smectic A phase and subsequently rotating only the analyzer clockwise by 15° from said darkest state with regard to the proceeding direction of incident light and $T_B$ is transmittance in an orientation state having another average molecular axis when only the analyzer is rotated counterclockwise by 15° with regard to the proceeding direction of the incident light from said darkest state.

2. A liquid crystal element according to claim 1, wherein the angle between the two different average molecular axes in the absence of voltage is no longer than 75% of the angle between the two different average molecular axes when voltage is applied.

3. A liquid crystal element according to claim 2, wherein the angle between the two different average molecular axes in the absence of voltage is no larger than 50% of the angle between the two different average molecular axes when voltage is applied.

4. A liquid crystal element according to claim 3, wherein the angle between the two different average molecular axes in the absence of voltage is no larger than 30% of the angle between the two different average molecular axes when voltage is applied.

5. A liquid crystal element according to claim 1, wherein the value of $|T_A - T_B|$ is no larger than 2% of the maximum value thereof.

6. A liquid crystal element according to claim 1, further comprising an orientation control film for the orientation-processing axes and a $SiO_2$ film disposed between said orientation-control film and the electrode.

7. A liquid crystal element according to claim 6, wherein said orientation-control film is a polyvinylalcohol film.

8. A liquid crystal element according to claim 1, wherein the spiral pitch of the ferroelectric liquid crystal is not less than 2 $\mu$m at the temperature of the smectic A–C phase transition point minus 5° C.

9. A liquid crystal element according to claim 8, wherein the spiral pitch is not less than 5 $\mu$m.

10. A liquid crystal element according to claim 1, wherein said ferroelectric liquid crystal is a chiral smectic C or H liquid crystal.

11. A liquid crystal element according to claim 1, wherein said uniaxial orientation-processing axes are rubbing orientation-processing axes, said axes being parallel and in opposite directions to one another.

12. A liquid crystal element according to claim 1, wherein the dielectric anisotropy of the ferroelectric liquid crystal is negative.

13. A liquid crystal apparatus comprising:
  a. a liquid crystal element comprising:
    a pair of substrates, each of said substrates including electrodes and uniaxial orientation-processing axes;
    a ferroelectric smectic liquid crystal disposed between said substrates and having a temperature range for producing a smectic A phase, said liquid crystal being in an orientation state having at least two different average molecular axes by being disposed between said pair of substrates which are separated by a distance which is small enough to suppress a spiral alignment structure of the ferroelectric smectic liquid crystal in the absence of an electric field; and
    a polarizer and an analyzer at 90° crossed nicols, wherein said ferroelectric smectic liquid crystal has a $|T_A - T_B|$ value no larger than 4% in the maximum value thereof within a wavelength of 440–600 nm, when oriented to produce in the absence of voltage, an angle between two different average molecular axes less than an angle between two different average molecular axes when voltage is applied, where $T_A$ (%) is transmittance in an orientation state having one average molecular axis when the arrangement of the polarizer and the analyzer is in the darkest state of the smectic A phase and subsequently rotating only the analyzer clockwise by 15° from said darkest state with regard to the proceeding direction of incident light and $T_B$ is transmittance in an orientation state having another average molecular axis when only the analyzer is rotated counterclockwise by 15° with regard to the proceeding direction of the incident light from said darkest state; and
  b. first means for applying to the ferroelectric liquid crystal an AC electric field insufficient to convert one of the average molecular axis into the other average molecular axis.

14. A liquid crystal apparatus according to claim 13, wherein the dielectric anisotropy of the ferroelectric liquid crystal is negative.

15. A liquid crystal apparatus according to claim 13, wherein the spiral pitch of the ferroelectric liquid crystal is not less than 2 $\mu$m at the temperature of the smectic A–C phase transition point minus 5° C.

16. A liquid crystal apparatus according to claim 15, wherein the spiral pitch is not less than 5 $\mu$m.

* * * * *

UNITED STATES PATENT AND TRADEMARK OFFICE
CERTIFICATE OF CORRECTION

PATENT NO. : 5,005,953
DATED : April 9, 1991
INVENTOR(S) : HIDEYUKI KAWAGISHI

It is certified that error appears in the above-identified patent and that said Letters Patent is hereby corrected as shown below:

On the title page

AT [56] REFERENCES CITED

U.S. Patent Documents,
        "4,941,736  7/1990  Taniguchi et aql." should read
        --4,941,736  7/1990  Taniguchi et al.--.

AT [57] ABSTRACT

Line 20, "TA(%)" should read --$T_A$(%)--.

SHEET 8 OF 10

FIG. 8, "ELECRIC" shoud read --ELECTRIC--.

SHEET 9 OF 10

FIG. 9, "92" (second occurrence) should read --93'--.

SHEET 10 OF 10

FIG. 11, "|E" should read --|E'--.

COLUMN 1

Line 16, "which" should read --it--.
    Line 18, "has" should read --having--.
    Line 21, "sprial" should read --spiral--.
    Line 22, "supporessing" should read --suppressing--.
    Line 62, "polalizer" should read --polarizer--.
    Line 63, "a" should read --an--.

UNITED STATES PATENT AND TRADEMARK OFFICE
CERTIFICATE OF CORRECTION

PATENT NO. : 5,005,953

DATED : April 9, 1991

INVENTOR(S) : HIDEYUKI KAWAGISHI

It is certified that error appears in the above-identified patent and that said Letters Patent is hereby corrected as shown below:

COLUMN 2

Line 6, "is" should read --are--.
    Line 38, "an" should read --and--.
    Line 64, "voltage-application" should read --voltage application--.

COLUMN 3

Line 33, "transmittance $T_a$" should read --transmittance $T_B$--.
    Line 56, "as ~~oo~~ in" should read --as ~~DD~~ in--.
    Line 57, "examples," should read --example--.
    Line 64, "observations." should read --observation.--.

COLUMN 4

Line 19, "characteristics" should read --characteristic--.
    Line 38, "longer" should read --larger--.

COLUMN 5

Line 59, "of" should read --on--.

UNITED STATES PATENT AND TRADEMARK OFFICE
CERTIFICATE OF CORRECTION

PATENT NO. : 5,005,953
DATED : April 9, 1991
INVENTOR(S) : HIDEYUKI KAWAGISHI

Page 3 of 4

It is certified that error appears in the above-identified patent and that said Letters Patent is hereby corrected as shown below:

COLUMN 6

Line 21, "films 15A and 15B." should read --films 65A and 65B.--.
Line 24, "films 15A and 15B." should read --films 65A and 65B.--.
Line 26, "films 15A and 15B," should read --films 65A and 65B,--.
Line 57, "form" should read --from--.

COLUMN 7

Line 4, "cone 92" should read --cone 93'--.
Line 22, "conceptional" should read --conceptual--.

COLUMN 8

Line 2, "shown" should be deleted.
Line 8, "untangles," should read --untangled,--.
Line 14, "axis," should read --axis.--.
Line 17, "one" should read --to one--.
Line 40, "is" should read --are--.
Line 56, "1-5 µM." should read --1-5 µm.--.

COLUMN 9

Line 51, "longer" should read --larger--.
Line 68, "orientation control" should read --orientation-control--.

UNITED STATES PATENT AND TRADEMARK OFFICE
CERTIFICATE OF CORRECTION

PATENT NO. : 5,005,953
DATED : April 9, 1991
INVENTOR(S) : HIDEYUKI KAWAGISHI

Page 4 of 4

It is certified that error appears in the above-identified patent and that said Letters Patent is hereby corrected as shown below:

COLUMN 10

Line 50, "TB" should read --$T_B$--.
Line 57, "axis" should read ----axes--.

Signed and Sealed this

Twenty-second Day of December, 1992

Attest:

DOUGLAS B. COMER

Attesting Officer

Acting Commissioner of Patents and Trademarks